US010607215B2

(12) United States Patent
Ronca et al.

(10) Patent No.: US 10,607,215 B2
(45) Date of Patent: Mar. 31, 2020

(54) ACCOUNT TOKENIZATION FOR VIRTUAL CURRENCY RESOURCES

(71) Applicant: Bank of America Corporation, Charlotte, NC (US)

(72) Inventors: James Gregory Ronca, Decatur, GA (US); Gregory Joseph Lloyd, Charlotte, NC (US); Tony England, Tega City, SC (US); Stephen Philip Selfridge, Huntersville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 907 days.

(21) Appl. No.: 14/871,293

(22) Filed: Sep. 30, 2015

(65) Prior Publication Data
US 2017/0091721 A1    Mar. 30, 2017

(51) Int. Cl.
*G06Q 20/36*    (2012.01)

(52) U.S. Cl.
CPC .................. *G06Q 20/367* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| 7,177,838 B1 | 2/2007 | Ling |
| 7,328,189 B2 | 2/2008 | Ling |
| 7,606,560 B2 | 10/2009 | Labrou et al. |
| 7,657,489 B2 | 2/2010 | Stambaugh |
| 7,734,527 B2 * | 6/2010 | Uzo ........................ G06Q 20/06 235/383 |
| 7,784,684 B2 | 8/2010 | Labrou et al. |

(Continued)

FOREIGN PATENT DOCUMENTS

| WO | WO 2012058099 | 5/2012 |
| WO | WO 2013095486 | 6/2013 |
| WO | 2016088087 A1 | 6/2016 |

OTHER PUBLICATIONS

Giannakoudi, "Internet Banking: The Digital Voyage of Banking and Money in CyberSpace", Information & Communications Technology Law, vol. 8, No. 3, 1999, University of Kent, Canterbury, UK.. (Year: 1999).*

(Continued)

*Primary Examiner* — Frantzy Poinvil
(74) *Attorney, Agent, or Firm* — Michael A. Springs; Moore & Van Allen PLLC; James C. Edwards (57) ABSTRACT

Embodiments of the present invention are used in a token based financial transaction system, whereby individual tokens associated with one or more financial accounts provided to one or more third parties. Embodiments credit an amount of a virtual currency in at least one bank account of a customer, wherein the at least one bank account has an associated amount of funds that is increased by the credit of the amount of virtual currency; generate a payment token associated with the at least one bank account of the customer; receive a transaction request to process a transaction using the token; determine that the transaction request is associated with a transaction having a transaction amount less than or equal to the amount of funds associated with the at least one bank account; and approve and settle the transaction.

9 Claims, 5 Drawing Sheets

(56) References Cited

U.S. PATENT DOCUMENTS

| | | | |
|---|---|---|---|
| 7,848,980 B2 | 12/2010 | Carlson | |
| 7,992,779 B2 | 8/2011 | Phillips et al. | |
| 8,032,932 B2 | 10/2011 | Speyer et al. | |
| 8,171,531 B2 | 5/2012 | Buer | |
| 8,249,805 B2 | 8/2012 | de Silva et al. | |
| 8,327,428 B2 | 12/2012 | Bailey et al. | |
| 8,327,429 B2 | 12/2012 | Speyer et al. | |
| 8,346,666 B2 | 1/2013 | Lindelsee et al. | |
| 8,352,364 B2 * | 1/2013 | Reardon | G06Q 20/10 705/35 |
| 8,352,378 B2 * | 1/2013 | Al-Herz | G06Q 20/02 705/18 |
| 8,380,177 B2 | 2/2013 | Laracey | |
| 8,407,142 B1 | 3/2013 | Griggs | |
| 8,498,940 B2 | 7/2013 | Pelegero et al. | |
| 8,522,039 B2 | 8/2013 | Hyndman et al. | |
| 8,572,689 B2 | 10/2013 | Radhakrishnan | |
| 8,584,251 B2 | 11/2013 | McGuire et al. | |
| 8,589,271 B2 | 11/2013 | Evans | |
| 8,590,008 B1 | 11/2013 | Ellmore | |
| 8,595,812 B2 | 11/2013 | Bomar et al. | |
| 8,620,790 B2 | 12/2013 | Priebatsch | |
| 8,660,946 B2 * | 2/2014 | Driemeyer | G06Q 10/10 705/35 |
| 8,682,802 B1 | 3/2014 | Kannanari | |
| 8,712,914 B2 * | 4/2014 | Lyons | G06Q 20/0655 705/44 |
| 8,751,381 B2 * | 6/2014 | Musser | G06Q 20/102 705/39 |
| 8,788,333 B2 | 7/2014 | Alba et al. | |
| 8,788,429 B2 | 7/2014 | Ticken | |
| 8,789,162 B2 | 7/2014 | Radhakrishnan | |
| 8,839,383 B2 | 9/2014 | Van Horn | |
| 8,874,467 B2 * | 10/2014 | Yahn | G07F 17/26 705/14.37 |
| 8,943,574 B2 | 1/2015 | Bailey et al. | |
| 8,985,442 B1 | 3/2015 | Zhou et al. | |
| 8,996,423 B2 | 3/2015 | Johnson et al. | |
| 9,055,053 B2 | 6/2015 | Radhakrishnan et al. | |
| 9,069,943 B2 | 6/2015 | Radhakrishnan et al. | |
| 2001/0045454 A1 | 11/2001 | Gangi | |
| 2003/0028481 A1 | 2/2003 | Flitcroft et al. | |
| 2003/0061170 A1 * | 3/2003 | Uzo | G06Q 20/06 705/64 |
| 2003/0163787 A1 | 8/2003 | Hay et al. | |
| 2005/0131874 A1 | 6/2005 | Verbitsky | |
| 2005/0171847 A1 * | 8/2005 | Ling | G06Q 20/04 705/14.23 |
| 2006/0249574 A1 | 11/2006 | Brown et al. | |
| 2008/0109319 A1 | 5/2008 | Foss | |
| 2008/0179395 A1 | 7/2008 | Dixon et al. | |
| 2009/0106134 A1 | 4/2009 | Royyuru | |
| 2009/0119757 A1 | 5/2009 | Acuna et al. | |
| 2009/0158404 A1 | 6/2009 | Hahn et al. | |
| 2009/0164327 A1 | 6/2009 | Bishop et al. | |
| 2010/0241571 A1 | 9/2010 | McDonald | |
| 2010/0268645 A1 | 10/2010 | Martino et al. | |
| 2011/0010277 A1 | 1/2011 | Enzaldo | |
| 2011/0166992 A1 | 7/2011 | Dessert et al. | |
| 2011/0191209 A1 | 8/2011 | Gould et al. | |
| 2011/0218907 A1 | 9/2011 | Dessert et al. | |
| 2011/0238517 A1 | 9/2011 | Ramalingam et al. | |
| 2012/0017089 A1 | 1/2012 | Kocher | |
| 2012/0030047 A1 | 2/2012 | Fuentes et al. | |
| 2012/0197794 A1 | 8/2012 | Grigg et al. | |
| 2012/0203700 A1 | 8/2012 | Ornce et al. | |
| 2012/0316992 A1 | 12/2012 | Oborne | |
| 2012/0317034 A1 | 12/2012 | Guha et al. | |
| 2012/0330846 A1 | 12/2012 | Light et al. | |
| 2013/0036048 A1 | 2/2013 | Campos et al. | |
| 2013/0054336 A1 | 2/2013 | Graylin | |
| 2013/0054454 A1 | 2/2013 | Purves et al. | |
| 2013/0054470 A1 | 2/2013 | Campos et al. | |
| 2013/0060678 A1 * | 3/2013 | Oskolkov | G06Q 40/02 705/39 |
| 2013/0097047 A1 * | 4/2013 | Kim | G07F 17/3244 705/26.4 |
| 2013/0110658 A1 | 5/2013 | Lyman et al. | |
| 2013/0159178 A1 | 6/2013 | Colon et al. | |
| 2013/0191227 A1 | 7/2013 | Pasa et al. | |
| 2013/0204775 A1 | 8/2013 | Midkiff et al. | |
| 2013/0204787 A1 | 8/2013 | Dubois | |
| 2013/0218657 A1 * | 8/2013 | Salmon | G06Q 10/00 705/14.29 |
| 2013/0246258 A1 | 9/2013 | Dessert | |
| 2013/0246272 A1 | 9/2013 | Kirsch | |
| 2013/0254052 A1 | 9/2013 | Royyuru et al. | |
| 2013/0254115 A1 | 9/2013 | Pasa et al. | |
| 2013/0262315 A1 | 10/2013 | Hruska | |
| 2013/0268437 A1 | 10/2013 | Desai et al. | |
| 2014/0006273 A1 | 1/2014 | Gopinath et al. | |
| 2014/0012647 A1 | 1/2014 | Hecht | |
| 2014/0032419 A1 | 1/2014 | Anderson et al. | |
| 2014/0130035 A1 | 5/2014 | Desai et al. | |
| 2014/0188719 A1 | 7/2014 | Poornachandran et al. | |
| 2014/0214640 A1 | 7/2014 | Mallikarjunan et al. | |
| 2014/0279554 A1 | 9/2014 | Priebatsch et al. | |
| 2014/0279566 A1 | 9/2014 | Verma et al. | |
| 2014/0330721 A1 * | 11/2014 | Wang | G06Q 20/40 705/44 |
| 2015/0019439 A1 | 1/2015 | Phillips | |
| 2015/0026072 A1 * | 1/2015 | Zhou | H04M 1/72522 705/71 |
| 2015/0032627 A1 | 1/2015 | Dill et al. | |
| 2015/0081536 A1 * | 3/2015 | Musser | G06Q 20/102 705/40 |
| 2015/0081557 A1 | 3/2015 | Kinfoil et al. | |
| 2015/0081567 A1 | 3/2015 | Boyle et al. | |
| 2015/0100495 A1 | 4/2015 | Salama et al. | |
| 2015/0120569 A1 | 4/2015 | Belshe et al. | |
| 2015/0199689 A1 * | 7/2015 | Kumnick | G06Q 20/3674 705/67 |
| 2015/0206137 A1 | 7/2015 | Mazarim Fernandes | |
| 2015/0254647 A1 | 9/2015 | Bondesen et al. | |
| 2015/0254648 A1 | 9/2015 | Clements et al. | |
| 2015/0254653 A1 | 9/2015 | Bondesen et al. | |
| 2015/0254663 A1 | 9/2015 | Bondesen et al. | |
| 2015/0254664 A1 | 9/2015 | Bondesen et al. | |
| 2015/0254770 A1 * | 9/2015 | Bondesen | G06Q 40/04 705/37 |
| 2015/0286995 A1 * | 10/2015 | Korosec | G06Q 20/06 705/39 |
| 2016/0050203 A1 | 2/2016 | Hefetz | |
| 2016/0055481 A1 * | 2/2016 | Ellis | G06Q 20/36 705/41 |
| 2016/0140542 A1 * | 5/2016 | Hammad | G06Q 20/12 705/67 |
| 2016/0337390 A1 | 11/2016 | Sridhara et al. | |

OTHER PUBLICATIONS

Ahmed, "A novel view on Electronic Cash and Electronic payment schemes : A comprehensive study", GESJ: Computer Science and Telecommunications 2010|No. 3(26), Princicpal, Sathak Institute of Technology, Ramanathapuram, Tamilnadu,India. (Year: 2010).*

European Patent Application No. 01400506 filed on Feb. 28, 2001, and printed as document No. EP 1132876 A2 entitled "Electronic Wallet System with Secure Inter-purse Operations" by inventor Tang-Talpin et al.

Mobile Payments in the United States Mapping Out the Road Ahead, Darin Contini, Mar. 25, 2011 (Year: 2011).

* cited by examiner

ACCOUNT TOKENIZATION FOR VIRTUAL CURRENCY RESOURCES

FIELD

This invention relates generally to the field of improving security for transactions, and more particularly embodiments of the invention relate to using tokens in place of account information in various ways in order to enter into transactions securely.

BACKGROUND

Entering into transactions using account information leaves an account holder open to potential account misappropriation because the customer's account information is shared between multiple parties (e.g., another user, a merchant, an acquiring financial institution, payment association networks, issuing financial institution, or the like) in order to complete the transaction.

BRIEF SUMMARY

Embodiments of the present invention address the above needs and/or achieve other advantages by providing apparatuses (e.g., a system, computer program product, and/or other device) and methods that help to enter into transactions using a token in place of actual account information.

Embodiments of the present invention disclose utilizing a token (e.g., a virtual payment instrument, or the like) associated with a payment device (e.g., a personal computer, a laptop, a mobile device, such as a phone, smartphone, tablet, or personal display device, a fob, payment wand, or any other like device) to enter into transactions. In some embodiments the token is associated directly with a payment device, while in other embodiments the token may be associated with a digital wallet that is associated with the payment device.

According to embodiments of the invention, a system for use in a token based financial transaction system, whereby individual tokens associated with one or more financial accounts provided to one or more third parties, the system includes a memory device; and a processing device operatively coupled to the memory device, wherein the processing device is configured to execute computer-readable program code to credit an amount of a virtual currency in at least one bank account of a customer, wherein the at least one bank account has an associated amount of funds that is increased by the credit of the amount of virtual currency; generate a payment token associated with the at least one bank account of the customer; receive a transaction request to process a transaction using the token; determine that the transaction request is associated with a transaction having a transaction amount less than or equal to the amount of funds associated with the at least one bank account; and approve and settle the transaction.

In some embodiments, the processing device is further configured to execute computer-readable program code to settle the transaction in an actual currency; and debit the bank account of the customer, thereby resulting in a reduction of the amount of the virtual currency.

In some embodiments, the processing device is further configured to execute computer-readable program code to break-up the amount of the virtual currency into at least a first and a second partial virtual currency amounts; credit the first partial virtual currency amount in a first of the at least one bank account of the customer; and credit the second partial virtual currency amount in a second of the at least one bank account of the customer.

In some embodiments, the processing device is further configured to execute computer-readable program code to enable standard unauthorized transaction protections regarding use of the token in a transaction, wherein the standard unauthorized transaction protections are not available for standard virtual currency transactions.

In some embodiments, the at least one bank account is credited only with virtual currency and any token issued in association with the at least one bank account is associated only with virtual currency but configured to be used in standard currency transactions.

In some embodiments, the processing device is further configured to execute computer-readable program code to convert the amount of the virtual currency to a credit amount of actual funds for crediting the at least one bank account; wherein the payment token is associated with actual funds.

In some embodiments, the processing device is further configured to execute computer-readable program code to maintain one or more of the at least one bank accounts as virtual currency without converting at least a portion of the currency to actual funds for crediting; associate the generated payment token with a transaction limit amount of actual funds; and in response to approving the transaction conducted in actual funds, request, from a virtual currency exchange, an exchange of an amount of the virtual currency from the at least one bank account for the transaction amount of actual funds. In some such embodiments, the processing device is further configured to execute computer-readable program code to send the amount of the virtual currency from the at least one bank account to the exchange; and receive the amount of actual funds from the exchange. In some embodiments, the processing device is further configured to execute computer-readable program code to determine a current exchange rate between the virtual currency and the actual currency; and wherein the amount of funds of the bank account is an actual amount of funds and crediting the at least one bank account comprises converting the virtual currency to actual currency based on the current exchange rate.

According to embodiments of the invention, a computer program product for use in a token based financial transaction system, whereby individual tokens associated with one or more financial accounts provided to one or more third parties, the computer program product comprising at least one non-transitory computer-readable medium having computer-readable program code portions embodied therein, the computer-readable program code portions includes an executable portion configured to credit an amount of a virtual currency in at least one bank account of a customer, wherein the at least one bank account has an associated amount of funds that is increased by the credit of the amount of virtual currency; an executable portion configured to generate a payment token associated with the at least one bank account of the customer; an executable portion configured to receive a transaction request to process a transaction using the token; an executable portion configured to determine that the transaction request is associated with a transaction having a transaction amount less than or equal to the amount of funds associated with the at least one bank account; and an executable portion configured to approve and settle the transaction.

In some such embodiments, the computer-readable program code portions further comprise an executable portion configured to settle the transaction in an actual currency; and an executable portion configured to debit the bank account of the customer, thereby resulting in a reduction of the amount of the virtual currency. In other such embodiments, the computer-readable program code portions further comprise an executable portion configured to break-up the amount of the virtual currency into at least a first and a second partial virtual currency amounts; an executable portion configured to credit the first partial virtual currency amount in a first of the at least one bank account of the customer; and an executable portion configured to credit the second partial virtual currency amount in a second of the at least one bank account of the customer.

In some embodiments, the computer-readable program code portions further comprise an executable portion configured to enable standard unauthorized transaction protections regarding use of the token in a transaction, wherein the standard unauthorized transaction protections are not available for standard virtual currency transactions.

In some embodiments, the at least one bank account is credited only with virtual currency and any token issued in association with the at least one bank account is associated only with virtual currency but configured to be used in standard currency transactions.

In some embodiments, the computer-readable program code portions further comprise an executable portion configured to convert the amount of the virtual currency to a credit amount of actual funds for crediting the at least one bank account; wherein the payment token is associated with actual funds.

In some embodiments, the computer-readable program code portions further comprise an executable portion configured to maintain one or more of the at least one bank accounts as virtual currency without converting at least a portion of the currency to actual funds for crediting; an executable portion configured to associate the generated payment token with a transaction limit amount of actual funds; and an executable portion configured to, in response to approving the transaction conducted in actual funds, request, from a virtual currency exchange, an exchange of an amount of the virtual currency from the at least one bank account for the transaction amount of actual funds.

In some embodiments, the computer-readable program code portions further comprise an executable portion configured to send the amount of the virtual currency from the at least one bank account to the exchange; and an executable portion configured to receive the amount of actual funds from the exchange.

In some embodiments, the computer-readable program code portions further comprise an executable portion configured to determine a current exchange rate between the virtual currency and the actual currency; and wherein the amount of funds of the bank account is an actual amount of funds and crediting the at least one bank account comprises converting the virtual currency to actual currency based on the current exchange rate.

According to embodiments of the invention, a method for use in a token based financial transaction system, whereby individual tokens associated with one or more financial accounts provided to one or more third parties, the method includes crediting an amount of a virtual currency in at least one bank account of a customer, wherein the at least one bank account has an associated amount of funds that is increased by the credit of the amount of virtual currency; generating a payment token associated with the at least one bank account of the customer; receiving a transaction request to process a transaction using the token; determining that the transaction request is associated with a transaction having a transaction amount less than or equal to the amount of funds associated with the at least one bank account; and approving and settling the transaction. In some such embodiments, the method also includes settling the transaction in an actual currency; and debiting the bank account of the customer, thereby resulting in a reduction of the amount of the virtual currency.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution" or "bank," one of ordinary skill in the art will appreciate that other embodiments of the invention may involve other businesses or institutions that take the place of or work in conjunction with the financial institution or bank to perform one or more of the processes or steps described herein as being performed by a financial institution or bank. Still in other embodiments of the invention the financial institution or bank described herein may be replaced with other types of businesses or institutions that offer account services to customers.

The present invention relates to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly, or within one or more digital wallets associated with the payment devices. In other embodiments, the tokens may be associated with electronic transactions that are made over the Internet instead of using a physical payment device. Utilizing a token as a payment instrument instead of actual account information, and specifically an account number improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear or are erased, while multi-use tokens may be utilized more than once before they disappear or are erased.

Tokens may be 16-digit numbers like credit, debit, or other like account numbers, may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings the like).

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token in order to represent the user account information (e.g., account number, user name, pin number, or the like). In other embodiments of the invention, the digital wallet may store some or all of the user account information, including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiment this may be the merchant) or another third party that stores the token, and the transaction may be processed accordingly.

Specific tokens, in some embodiments, may be tied to a single user account, but in other embodiments, may be tied to multiple user accounts, as will be described throughout this application. Moreover, the tokens may be associated with a specific digital wallet or multiple digital wallets based on the institutions and accounts with which the tokens may be associated. Moreover, the tokens themselves, or the user accounts, users, digital wallets, or the like associated with the tokens may have limitations that limit the transactions that the users may enter into using the tokens. The limitations may include, limiting the transactions of the user to a single merchant, a group of multiple merchants, merchant categories, single products, a group a products, product categories, transaction amount limits, transaction numbers, geographic locations, or other like limits as is described herein.

Figure 1:
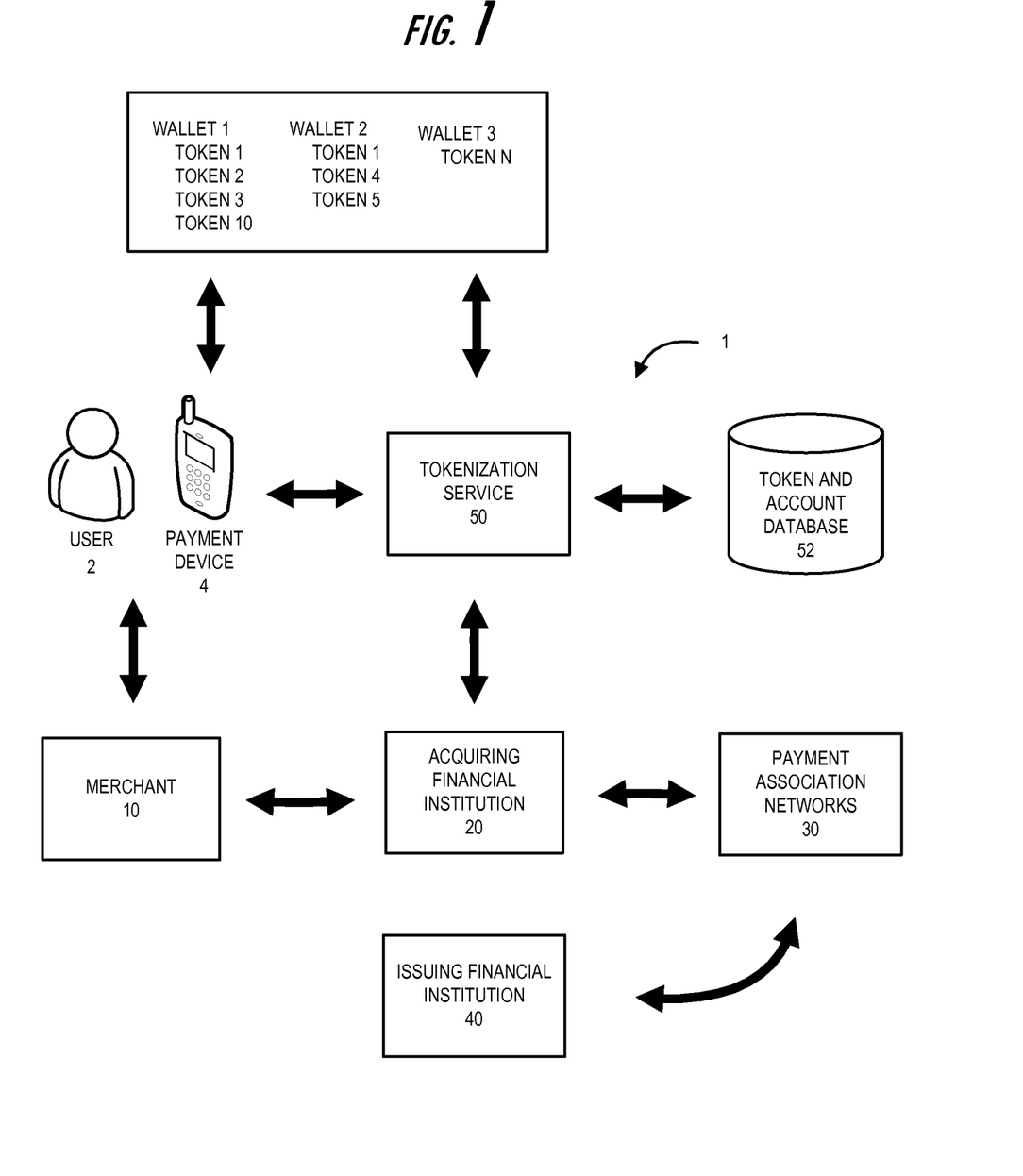
FIG. 1 illustrates a high level process flow for a entering into a transaction using a token, in accordance with one embodiment of the present invention.
Figure 2:
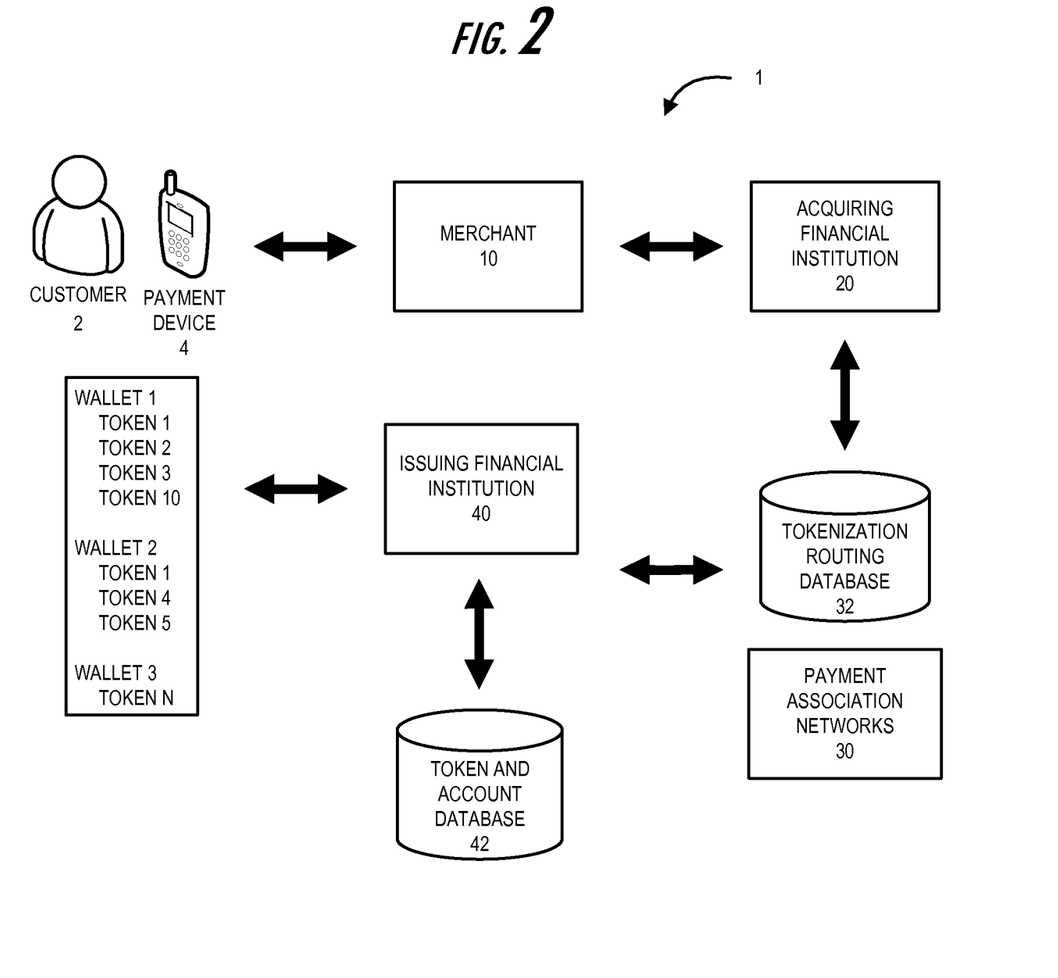
FIG. 2 illustrates a high level process flow for a entering into a transaction using a token, in accordance with one embodiment of the present invention.
Figure 3:
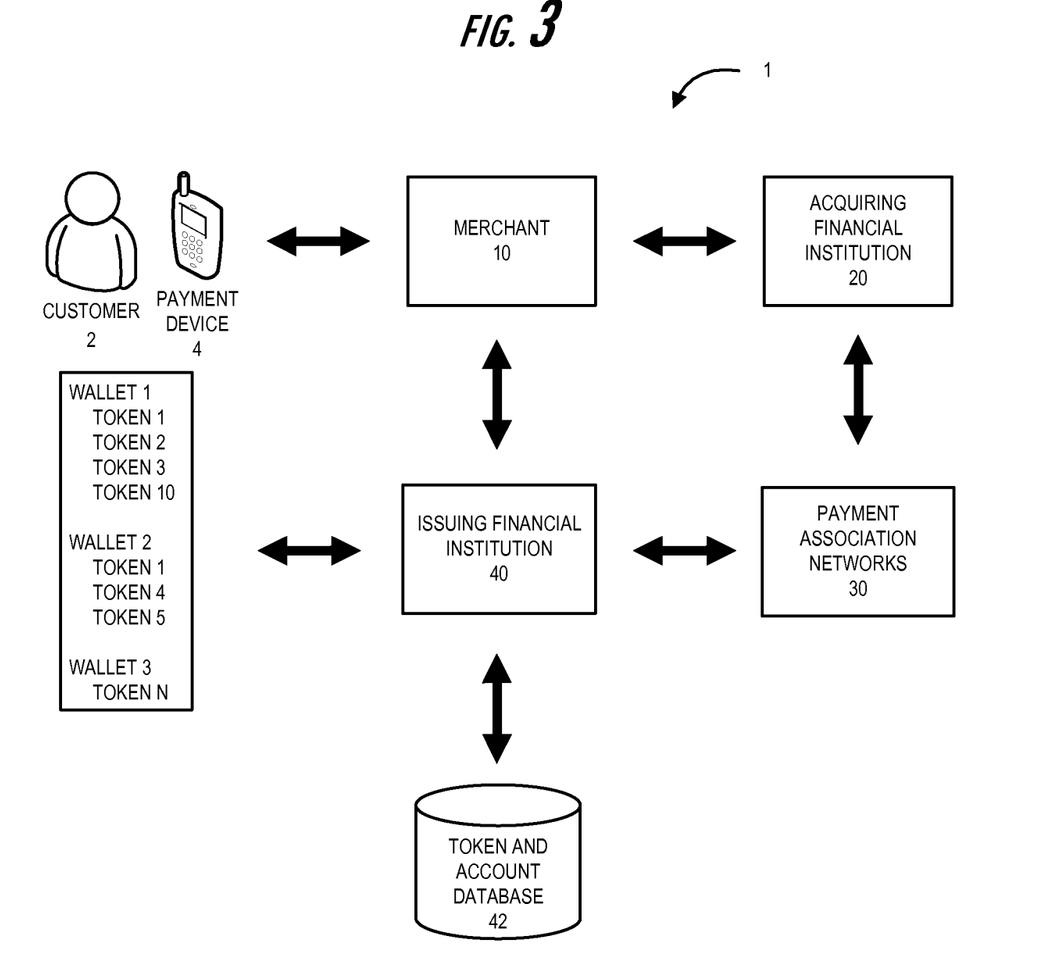
FIG. 3 illustrates a high level process flow for a entering into a transaction using a token, in accordance with one embodiment of the present invention.

FIGS. 1 through 3 illustrate a number of different ways that the user 2 may use one or more tokens in order to enter into a transaction and make payments associated with the transaction. FIG. 1, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 1 (as well as in FIGS. 2 and 3), a user 2 may utilize a payment device 4 (or in other embodiments a payment instrument over the Internet) to enter into a transaction. FIG. 1 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like). As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument may be used to enter into the transaction. The payment instrument may be the same as the token or digital wallet associated with the payment device 4, except they are not associated with specific payment device. For example, the token or digital wallet may be associated with an application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 2 with the one or more payment devices 4 may utilize the token. Alternatively, the payment device 4 may have one or more digital wallets stored on the payment device 4 that allow the user 2 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 1, a tokenization service 50 may be available for the user 2 to use during transactions. As such, before entering into a transaction, the user 2 may generate (e.g., create, request, or the like) a token in order to make a payment using the tokenization service 50, and in response the tokenization service 50 provides a token to the user and stores an association between the token and the user account number in a secure token and account database 52. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, or the like) associated with the token that may limit the transactions in which the user 2 may enter. The limits may be placed on the token by the user 2, or another entity (e.g., person, company, or the like) responsible for the transactions entered into by the user 2 using the account associated with the token. The generation of the token may occur at the time of the transaction or well in advance of the transaction, as a one-time use token or multi-use token.

After or during creation of the token the user 2 enters into a transaction with a merchant 10 using the payment device 4 (or payment instrument over the Internet). In some embodiments the user 2 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 2 is entering with the merchant 10.

The merchant 10 submits the token (as well as any user account information not substituted by a token) and the transaction information for authorization along the normal processing channels (also described as processing rails), which are normally used to process a transaction made by the user 2 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described is when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the transaction is allowed), then the acquiring financial institution 20 thereafter sends the user account number, the other user information, and the transaction information directly to the issuing financial institution 40, or otherwise indirectly through the card association networks 30. The financial institution determines if the user 2 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 2 is completed. After the transaction is completed the token may be deleted, erased, or the like if it is a single-use token, or stored for further use if it is a multi-use token.

The embodiment illustrated in FIG. 1 prevents the user account number and other user information from being presented to the merchant 10; however, the tokenization service 50, acquiring financial institution 20, the card association networks 30, and the issuing financial institution 40 all utilize the actual user account number and other user information to complete the transaction.

FIG. 2 illustrates another embodiment of a token system 1, in which the user 2 may utilize a payment device 4 (or payment instrument over the Internet) to enter into transactions with merchants 10 utilizing tokens instead of user account numbers. As illustrated in FIG. 2, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 3). In other embodiments, the issuing financial institution 40 may create the digital wallet for the user 2 (e.g., for through a wallet created for a business client or retail client associated with the user 2) and include one or more tokens for various types of transactions, products, or the like. The issuing financial institution 40 may store the tokens, the associated user account information (e.g., including the user account number), and any limits on the use of the token, as was previously described with respect to the tokenization service 50. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 2 may enter into a transaction with the merchant 10 using a payment device 4 (or a payment instrument through the Internet). In one embodiment the user 2 may enter into the transaction with a token associated with the payment device 4 itself (or a payment instrument through the Internet). In other embodiments, a specific digital wallet and/or a specific account within the digital wallet may be selected for a particular merchant with whom the user 2 wants to enter into a transaction. For example, the user 2 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with tokens and the corresponding issuing financial institutions 40 to which transactions associated with the tokens should be routed.

Once the token and transaction details are routed to the issuing financial institution 40, the issuing financial institution 20 determines the user account associated with the token through the use of the token account database 42. The financial institution determines if the funds are available in the user account for the transaction and if the transaction information meets other limits by comparing the transaction information with the limits associated with the token or the user account associated with the token. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 2 allows the user and the financial institution to shield the user's account number and other user information from all of the entities in the payment processing system because the merchant 10, acquiring merchant bank 20, payment association networks 30, or other institutions in the payment processing system only used the token and/or other shielded user information to process the transaction. Only the issuing financial institution 40 has the actual account number of the user 2.

FIG. 3 illustrates another embodiment of the token system 1, in which the user 2 may utilize a payment device 4 (or payment instrument over the Internet) to enter into transactions with a merchant 10 utilizing a token instead of a user account number and/or other user account information. As illustrated in FIG. 3, the user 2 may have one or more tokens stored in the payment device 2, which may be associated with one or more digital wallets, or one or more user accounts within the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) and/or the merchant 10 to request a token for the payment device 4, either for the device itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 2 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 2, while the financial institution 40 may store the user account information with the token provided to the user 2. The financial institution may communicate directly with the user 2, or through the merchant 10 in some embodiments, in order to associate the token with the user 2. Since the merchant 10 provides, or is at least notified by the financial institution 40, that a specific token, or groups of tokens, are associated with a specific issuing financial institution 40, then the merchant 10 may associate routing information and transaction information with the token when the user 2 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information directly to the issuing financial institution 40, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 2 that the transaction is allowed or denied.

As is the case with the token system 2 in FIG. 2, the token system in FIG. 3 allows the user 2 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

The embodiments of the invention illustrated in FIGS. 1 through 3 are only example embodiments of the invention, and as such it should be understood that combinations of these embodiments, or other embodiments not specifically described herein, may be utilized in order to process transactions between a user 2 and merchant 10 using one or more tokens as a substitute for user account numbers or other user account information, such that the merchant, or even other institutions in the payment processing system do not have access to the actual user accounts or account information.

As briefly discussed above, if the issuing financial institution 40 creates the digital wallet not only does the financial institution 40 receive transaction information along the normal processing channels, but the financial institution 50 may also receive additional transaction information from the user 2 through the digital wallet using the application program interfaces (APIs) or other application created for the digital wallet. For example, geographic location information of the user 2, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 2, the issuing financial institution 40 may not receive all the transaction information from the traditional transaction processing channels or from the digital wallet. As such, the issuing financial institution 40 may have to receive additional transaction information from another application associated with the user 2 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the user enters into transactions using the digital wallets.

Moreover, when there is communication between the digital wallets of the users 2 and the issuing financial institution 40 or another institution, transactions in which the user 2 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 1 through 3.

Various embodiments of the invention enable a user to bank a virtual currency into an account. One or more tokens may then be associated with the virtual currency for use by the customer in transactions. Instead of the user transacting directly in the virtual currency, the customer uses the token. Such a configuration allows for all the benefits associated with a bank account such as unauthorized transaction protection and the like. Such a configuration also allows the customer to break up a virtual currency to provide fractions of the virtual currency.

Figure 4A:
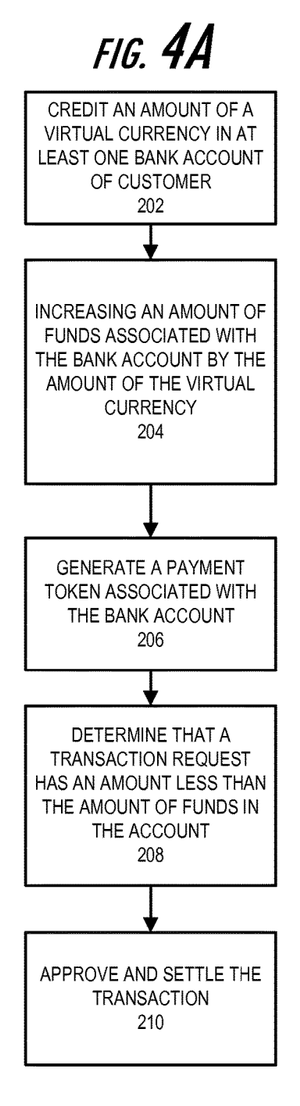
FIGS. 4A-4C illustrate process flows for account tokenization for virtual currency resources, in accordance with one embodiment of the present invention.
Figure 4B:
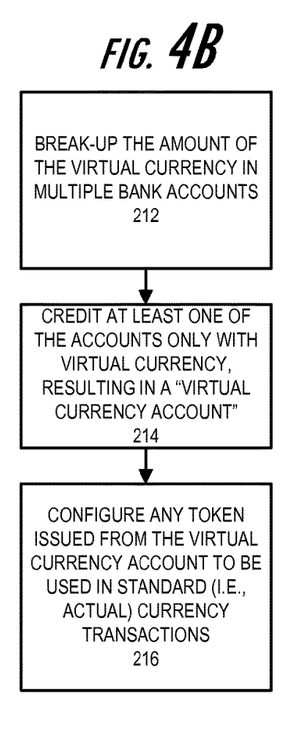
Figure 4C:
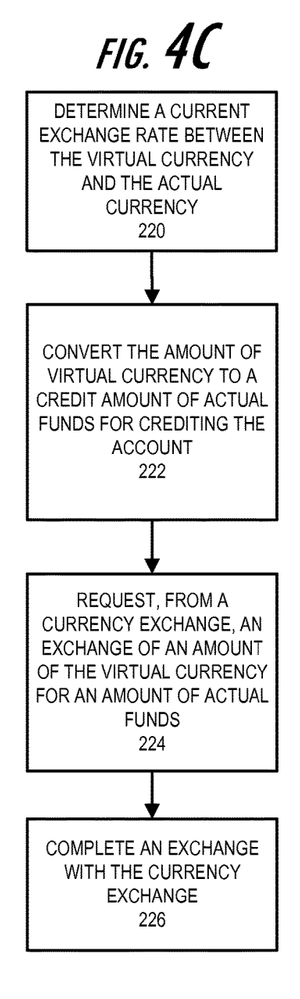

FIGS. 4A-4C are flowcharts of methods for provisioning tokens, and in some cases, managing virtual currencies including tokenization of virtual currencies. Referring to FIG. 4A, a method for tokenization of virtual currencies is illustrated. The first step, as represented by block 202, is to credit an amount of a virtual currency in at least one bank account of a customer. This credit may take the form of a virtual credit to a virtual account (one that is not backed by actual funds or one that is backed by actual funds but that is maintained or managed in terms of its market virtual currency value or otherwise), a conversion of some or all the virtual currency to actual currency to a regular account, or the like.

The next step, represented by block 204, is increasing an amount of funds associated with the bank account by the amount of the virtual currency. Next, as represented by block 206, the system generates a payment token associated with the bank account. In some embodiments, a customer or other user may initiate the generation of the token through an online banking application, mobile application or the like.

The next step, represented by block 208, is to determine that a transaction request has an amount less than the amount of funds in the account. This request is typically received at a financial institution system (FI system) from a merchant system. In order to approve the transaction, the necessary amount of funds must be available. However, in some instances, the funds for the transaction may be credited from another account similar to an inadequate funds protection for standard demand deposit accounts. Finally, the system approves and settles the transaction, as represented by block 210.

Referring to FIG. 4B, a method for managing virtual currency is illustrated. The first step, represented by block 212, is to break-up the amount of the virtual currency in multiple bank accounts. The next step, represented by block 214, is to credit at least one of the accounts only with virtual currency, which results in a "virtual currency account". The final step, represented by block 216, is to configure any token issued from the virtual currency account to be used in standard currency transactions (i.e., actual currency transactions).

In various embodiments, the customer and/or the issuing institution may desire that the customer provide approval of use of an issued token. The first step is to, in response to receiving a transaction request, send an alert indicating the transaction request to the customer. This alert may have multiple purposes. For example, the alert may be intended to request approval from the customer to complete the transaction or the alert may be intended solely for informational purposes. In some cases, the alert includes an option for the customer to select an input that halts the transaction, but otherwise is meant primarily for informational purposes. The alert may include information such as the name of the merchant at which the transaction is requested, the amount of the transaction, the location of the merchant, the merchant category and the like.

In the event the customer is asked to provide approval of the transaction or other input concerning the transaction, such as a situation in which the customer desires to halt the transaction, the next step is to authenticate the customer through an online banking session or a mobile application. The customer may be authenticated in a variety of ways and such authentication may include a continuum of authentication such that, for a lower concern transaction (e.g., a low transaction amount), the level of required authentication is low. On the other hand, for a higher concern transaction (e.g., a high transaction amount), the level of required authentication is high as well. The levels or thresholds for transaction amount or other criteria for varying authentication level (such as identity of merchant or otherwise) may be input by the customer as preferences or may be predetermined thresholds, amounts, value or the like.

As a specific example, if a user is requesting a transaction amount of $1000 using a token issued by the customer, and the customer has established a "high" concern transaction threshold amount of $500, then the system may require that the customer approve/deny the transaction. It may also require a relatively "high" level of authentication such as a two-factor authentication. On the other hand, if the customer has established a "low" concern transaction threshold amount of $100, a medium amount of $200 and a high threshold amount of $500, then, for transactions less than $100, the customer may not provide approval, for transactions in between $100 and $200, the customer may only have an option to halt the transaction rather than the system requiring approval from the customer to complete the transaction, for transactions between $200 and $500, the customer may provide medium authentication and required approval, and for transactions greater than $500, the customer may provide high authentication and required approval.

The next step is to prompt the customer to approve or deny the transaction. The next step is to receive, in response to the alert, an approval communication from the customer approving/denying the transaction. Finally, the last step is to approve and settle the transaction.

Referring to FIG. 4C, another method for managing virtual currency is illustrated. The first step, as represented by block 220, is to determine a current exchange rate between the virtual currency and the actual currency. The next step, as represented by block 222, is to convert the amount of virtual currency to a credit amount of actual funds for crediting the account. The next step, represented by block 224, is to request, from a currency exchange, an exchange of an amount of the virtual currency for an amount of actual funds. The final step, as represented by block 226, is to complete an exchange with the currency exchange.

In various embodiments, the virtual currency may not be converted to actual currency, may be converted in whole or in part and such conversion may occur prior to deposit or after deposit. In some embodiments, the system provides an interface or dashboard for managing virtual currency. For example, the dashboard may enable a user to convert some or all virtual currency into actual currency, shift virtual and/or actual currency among accounts, transfer virtual and/or actual currency between intra-institution accounts and/or extra-institution accounts and the like.

Figure 5:
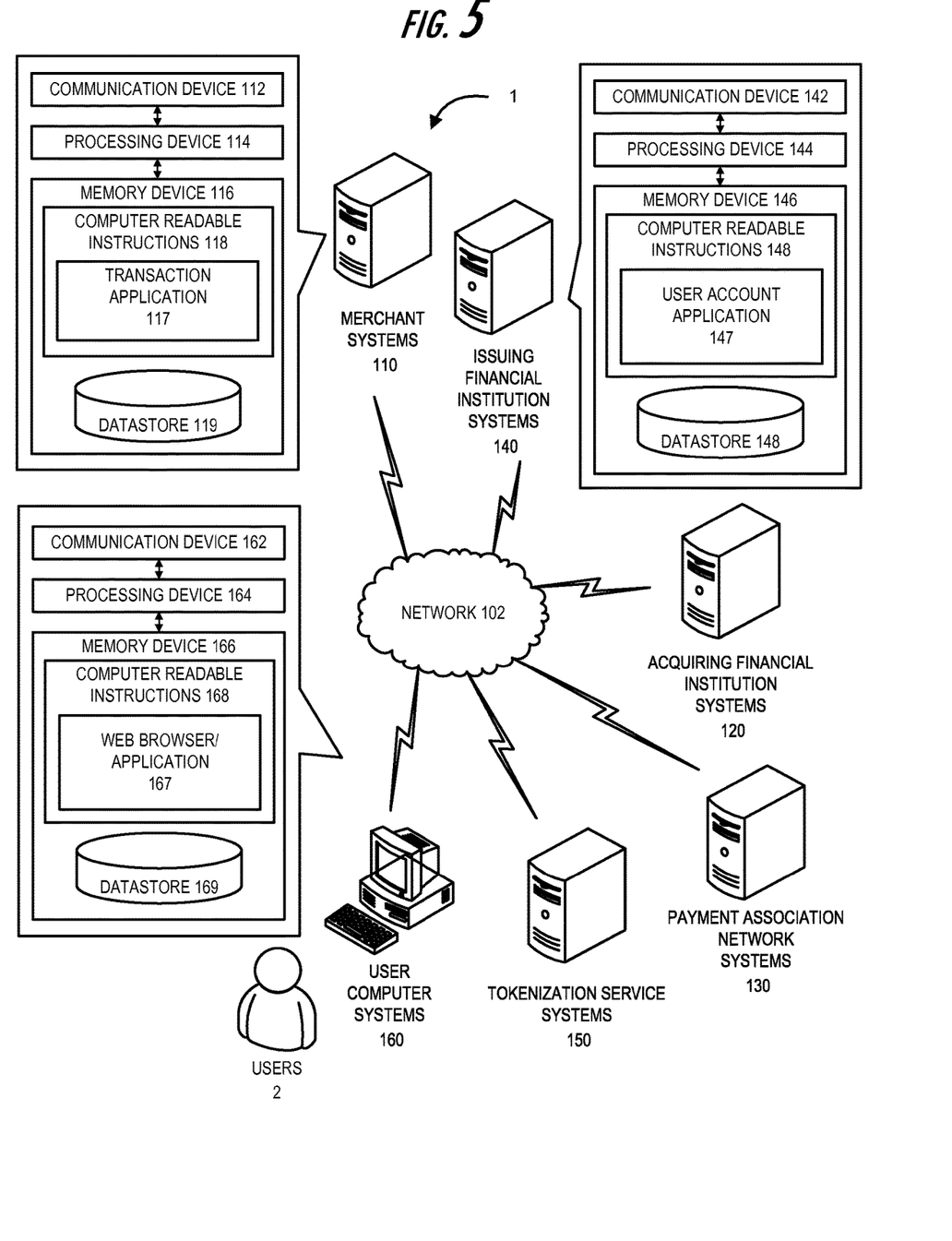
FIG. 5 illustrates a block diagram for a token system environment, in accordance with one embodiment of the present invention.

FIG. 5 illustrates a token system 100 environment, in accordance with an embodiment of the present invention. As illustrated in FIG. 5, the user computer systems 160 are operatively coupled, via a network 102 to the merchant systems 110, issuing financial institution systems 140, acquiring financial institution systems 120, payment association networks 130, and/or the tokenization service systems 150. In this way, the user 2 may utilize the user computer systems 160 to enter into secure transactions using a token with the merchant 10 through the use of the merchant systems 110, acquiring financial systems 120, payment association networks 130, the issuing financial institution systems 140, and/or the tokenization service systems 150. FIG. 5 illustrates only one example of embodiments of a token system 100, and it will be appreciated that in other embodiments one or more of the systems (e.g., computers, mobile devices, servers, or other like systems) may be combined into a single system or be made up of multiple systems.

The network 102 may be a global area network (GAN), such as the Internet, a wide area network (WAN), a local area network (LAN), or any other type of network or combination of networks. The network 102 may provide for wireline, wireless, or a combination of wireline and wireless communication between devices on the network.

As illustrated in FIG. 5, the user computer systems 160 generally comprise a communication device 162, a processing device 164, and a memory device 166. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 164 is operatively coupled to the communication device 162 and the memory device 166. The processing device 164 uses the communication device 162 to communicate with the network 102 and other devices on the network 102, such as, but not limited to, the merchant systems 110, issuing financial institution systems 140, acquiring financial institution systems 120, payment association network systems 130, and/or tokenization service systems 150. As such, the communication device 162 generally comprises a modem, server, or other device for communicating with other devices on the network 102, and a display, camera, keypad, mouse, keyboard, microphone, and/or speakers for communicating with one or more users 102. The user computer systems 160 may include, for example, a payment device 4, which may be a personal computer, a laptop, a mobile device (e.g., phone, smartphone, tablet, or personal display device ("PDA"), or the like) or other like devices whether or not the devices are mentioned within this specification. In some embodiments, the user computer systems 160, such as a payment device 4, or other devices, could include a data capture device that is operatively coupled to the communication device, processing device 164, and the memory device 166. The data capture device could include devices such as, but not limited to a location determining device, such as a radio frequency identification ("RFID") device, a global positioning satellite ("GPS") device, Wi-Fi triangulation device, or the like, which can be used by a user 2, institution, or the like to capture information from a user 2, such as but not limited to the location of the user 2.

As further illustrated in FIG. 5, the user computer systems 160 comprises computer-readable instructions 168 stored in the memory device 166, which in one embodiment includes the computer-readable instructions 168 of a tokenization application 167 (e.g., a digital wallet or other application that utilizes tokens). In some embodiments, the memory device 166 includes a datastore 169 for storing data related to the user computer system 160, including but not limited to data created and/or used by tokenization application 167. As discussed above the tokenization application 167 allows the users 2 to enter into secure transactions using one or more tokens instead of customer account number or other customer information.

As further illustrated in FIG. 5, the merchant systems 110 generally comprise a communication device 112, a processing device 114, and a memory device 116. The processing device 114 is operatively coupled to the communication device 112 and the memory device 116. The processing device 114 uses the communication device 112 to communicate with the network 102, and other devices on the network 102, such as, but not limited to, the user computer systems 160, issuing financial institution systems 140, acquiring financial institution systems 120, payment association network systems 130, and/or the tokenization service systems 150. As such, the communication device 112 generally comprises a modem, server, or other device(s) for communicating with other devices on the network 102.

As illustrated in FIG. 5, the merchant systems 110 comprise computer-readable program instructions 118 stored in the memory device 116, which in one embodiment includes the computer-readable instructions 118 of a transaction application 117. In some embodiments, the memory device 116 includes a datastore 119 for storing data related to the merchant systems 110, including but not limited to data created and/or used by the transaction application 117. The transaction application 117 processes transactions with the user regardless of whether or not the user is using tokens or the actual account number or other account information.

As further illustrated in FIG. 5, the issuing financial institution systems 140 generally comprise a communication device 142, a processing device 144, and a memory device 146. The processing device 144 is operatively coupled to the communication device 142 and the memory device 146. The processing device 144 uses the communication device 142 to communicate with the network 102, and other devices on the network 102, such as, but not limited to, the user computer systems 160, merchant systems 110, acquiring financial institution systems 120, payment association network systems 130, and/or the tokenization service systems 150. As such, the communication device 142 generally comprises a modem, server, or other devices for communicating with other devices on the network 102.

As illustrated in FIG. 5, the issuing financial institution systems 140 comprise computer-readable program instructions 148 stored in the memory device 146, which in one embodiment includes the computer-readable instructions 148 of a user account application 147. In some embodiments, the memory device 146 includes a datastore 149 for storing data related to the issuing financial institution systems 140, including but not limited to data created and/or used by the user account application 147. The user account application 147 allows the issuing financial institution to store information regarding the user accounts. For example, in the embodiments in which the issuing financial institution 40 is responsible for managing the tokenization, the user account application 147 stores the tokens associated with the account number or the other customer information, which the users 2 utilize to enter into transactions. In other embodiments of the invention, the association of the tokens and accounts numbers and other account information from the issuing financial institution 40 may be stored by a third party.

The acquiring financial institution systems 120 are operatively coupled to the user computer systems 160, merchant systems 110, payment association network systems 130, issuing financial institutions 140, or tokenization service systems 150 through the network 102. The acquiring financial institution systems 120 have devices that are the same as or similar to the devices described for the user computer systems 160, merchant systems 110, or the issuing financial institution systems 140 (e.g., communication device, processing device, memory device with computer-readable instructions, datastore, or the like). Thus, the acquiring financial institution systems 120 communicate with the user computer systems 160, merchant systems 110, payment association network systems 130, issuing financial institution systems 140, and/or the tokenization service systems 150, in the same or similar way as previously described with respect to these systems above. The acquiring financial institution systems 120, in some embodiments, receives the tokens and/or other customer information, along with the transactions information for a transaction, from the merchants 10 and distributes this information to the proper tokenization service 50, payment association networks 30, or directly the issuing financial institution 40.

The payment association network systems 130 are operatively coupled to the user computer systems 160, merchant systems 110, acquiring financial institution systems 120, issuing financial institutions 140, or tokenization service systems 150 through the network 102. The payment association network systems 130 have devices that are the same as or similar to the devices described for the user computer systems 160, merchant systems 110, or the issuing financial institution systems 140 (e.g., communication device, processing device, memory device with computer-readable instructions, datastore, or the like). Thus, the payment association network systems 130 communicate with the user computer systems 160, merchant systems 110, acquiring financial institution systems 120, issuing financial institution systems 140, and/or the tokenization service systems 150, in the same or similar way as previously described with respect to these systems above. The payment association networks systems 130, in some embodiments, receive the tokens and/or other customer information, along with the transactions information for a transaction, from the merchants 10 or the acquiring financial institution 20, and distribute this information to the proper issuing financial institution 40.

The tokenization service systems 150 are operatively coupled to the user computer systems 160, merchant systems 110, acquiring financial institution systems 120, or issuing financial institutions 140 through the network 102. The tokenization service systems 150 have devices the same or similar to the devices described for the user computer systems 160, merchant systems 110, or the issuing financial institution systems 140 (e.g., communication device, processing device, memory device with computer-readable instructions, datastore, or the like). Thus, the tokenization service systems 150 communicate with the user computer systems 160, merchant systems 110, acquiring financial institution systems 120, and/or issuing financial institution systems 140, in the same or similar way as previously described with respect to the these systems above. The tokenization service systems 150, in some embodiments, create, associate, and store the tokens, account numbers, and/or other customer information in order to shield the account numbers or other customer account information from the merchants 10, and other parties as described throughout this specification. In some embodiments as illustrated in FIG. 1, the tokenization service systems 150 may be operated by a third party entity. In other embodiments the tokenization service systems 150 may be operated by the issuing financial institution 40 or entity associated with the issuing financial institution 40, such that only the issuing financial institution 40 has access to the actual account number or other account information.

It is understood that the systems and devices described herein illustrate one embodiment of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 6858US1.014033.2532 | To Be Assigned | MERCHANT TOKENIZATION MIGRATION INFRASTRUCTURE SYSTEM | Concurrently Herewith |
| 6859US1.014033.2533 | To Be Assigned | TOKENIZATION PROVISIONING AND ALLOCATING SYSTEM | Concurrently Herewith |
| 6860US1.014033.2534 | To Be Assigned | NON-INTRUSIVE GEO-LOCATION DETERMINATION ASSOCIATED WITH TRANSACTION AUTHORIZATION | Concurrently Herewith |
| 6860US2.014033.2535 | To Be Assigned | NON-INTRUSIVE GEO-LOCATION DETERMINATION ASSOCIATED WITH TRANSACTION AUTHORIZATION | Concurrently Herewith |

| Docket Number | U.S. patent application Ser. No. | Title | Filed On |
| --- | --- | --- | --- |
| 6803US1.014033.2557 | To Be Assigned | SYSTEM FOR ELECTRONIC COLLECTION AND DISPLAY OF ACCOUNT TOKEN USAGE AND ASSOCIATION | Concurrently Herewith |
| 6861US1.014033.2537 | To Be Assigned | TOKEN PROVISIONING FOR NON-ACCOUNT HOLDER USER WITH LIMITED TRANSACTION FUNCTIONS | Concurrently Herewith |

What is claimed is:

1. A system for use in a token based financial transaction system, whereby individual tokens associated with one or more financial accounts are provided to one or more third parties, the system comprising:
 a memory device; and
 a processing device operatively coupled to the memory device, wherein the processing device is configured to execute computer-readable program code to:
  credit an amount of a virtual currency in at least one financial account of a customer, wherein the at least one financial account has an associated amount of funds that is increased by the credit of the amount of virtual currency;
  generate a payment token associated with the at least one financial account of the customer and a predetermined transaction amount threshold;
  receive a transaction request to process a transaction using the token;
  determine that (i) the transaction request is associated with a transaction having a transaction amount less than or equal to the amount of funds associated with the at least one financial account and (ii) the transaction amount is less than or equal to the predetermined transaction amount threshold;
  in response to determining that the transaction amount exceeds a customer-defined transaction amount limit, request that the customer provide two-factor authentication;
  receive two-factor authentication inputs from the customer and authenticate the customer based on the received two-factor authentication inputs; and
  in response to determining (i) and (ii) and authenticating the customer, approve and settle the transaction.

2. The system of claim 1, wherein the processing device is further configured to execute computer-readable program code to:
 settle the transaction in an actual currency; and
 debit the financial account of the customer, thereby resulting in a reduction of the amount of the virtual currency.

3. The system of claim 1, wherein the processing device is further configured to execute computer-readable program code to:
 break-up the amount of the virtual currency into at least a first and a second partial virtual currency amounts;
 credit the first partial virtual currency amount in a first of the at least one financial account of the customer; and
 credit the second partial virtual currency amount in a second of the at least one financial account of the customer.

4. The system of claim 1, wherein the processing device is further configured to execute computer-readable program code to:
 enable standard unauthorized transaction protections regarding use of the token in a transaction, wherein the standard unauthorized transaction protections are not available for standard virtual currency transactions.

5. The system of claim 1, wherein the at least one financial account is credited only with virtual currency and any token issued in association with the at least one financial account is associated only with virtual currency but configured to be used in standard currency transactions.

6. The system of claim 1, wherein the processing device is further configured to execute computer-readable program code to:
 convert the amount of the virtual currency to a credit amount of actual funds for crediting the at least one financial account;
 wherein the payment token is associated with actual funds.

7. The system of claim 1, wherein the processing device is further configured to execute computer-readable program code to:
 maintain one or more of the at least one financial accounts as virtual currency without converting at least a portion of the currency to actual funds for crediting;
 associate the generated payment token with a transaction limit amount of actual funds; and
 in response to approving the transaction conducted in actual funds, request, from a virtual currency exchange, an exchange of an amount of the virtual currency from the at least one bank account for the transaction amount of actual funds.

8. The system of claim 7, wherein the processing device is further configured to execute computer-readable program code to:
 send the amount of the virtual currency from the at least one financial account to the virtual currency exchange; and
 receive the amount of actual funds from the exchange.

9. The system of claim 1, wherein the processing device is further configured to execute computer-readable program code to:
 determine a current exchange rate between the virtual currency and the actual currency; and
 wherein the amount of funds of the financial account is an actual amount of funds and crediting the at least one financial account comprises converting the virtual currency to actual currency based on the current exchange rate.

* * * * *